United States Patent
Levy et al.

(10) Patent No.: US 9,802,849 B2
(45) Date of Patent: Oct. 31, 2017

(54) CHEMICAL FREE AND ENERGY EFFICIENT DESALINATION SYSTEM

(71) Applicant: I.D.E. TECHNOLOGIES LTD, Kadima (IL)

(72) Inventors: Amnon Levy, Ramat Hasaron (IL); Boris Liberman, Tel-Aviv (IL); Gal Greenberg, Ein Sarid (IL)

(73) Assignee: I.D.E. TECHNOLOGIES LTD., Kadima (IL)

( * ) Notice: Subject to any disclaimer, the term of this patent is extended or adjusted under 35 U.S.C. 154(b) by 0 days.

(21) Appl. No.: 14/823,991

(22) Filed: Aug. 11, 2015

(65) Prior Publication Data

US 2015/0344340 A1 Dec. 3, 2015

Related U.S. Application Data

(63) Continuation of application No. 13/982,748, filed as application No. PCT/IB2011/054739 on Oct. 24, 2011, now Pat. No. 9,162,911.

(30) Foreign Application Priority Data

Feb. 1, 2011 (GB) .................................. 1101717.5

(51) Int. Cl.
*C02F 9/00* (2006.01)
*C02F 3/30* (2006.01)
(Continued)

(52) U.S. Cl.
CPC .............. *C02F 9/00* (2013.01); *B01D 61/022* (2013.01); *B01D 61/025* (2013.01); *B01D 61/04* (2013.01);
(Continued)

(58) Field of Classification Search
None
See application file for complete search history.

(56) References Cited

U.S. PATENT DOCUMENTS 3,190,448 A 6/1965 Johnston et al.
4,036,757 A 7/1977 Peasley
(Continued)

FOREIGN PATENT DOCUMENTS

CN 2280093 4/1998
CN 2856038 1/2007
(Continued)

OTHER PUBLICATIONS

Feron, D., ed., "Corrosion Behaviour and Protection of copper and aluminum alloys in seawater," CRC Press, New York, 2007.*
(Continued)

*Primary Examiner* — Chester Barry
(74) *Attorney, Agent, or Firm* — Symbus Law Group LLC; Clifford D. Hyra

(57) ABSTRACT

A desalination system (100) having an intake unit (110) providing seawater to a pre-treatment unit (120) connected to a reverse osmosis (RO) desalination unit (130) and a post treatment unit (150). The desalination system (100) is configured to operate without any external addition of chemicals to simplify logistics and regulation concerns. The units of the system are configured to prevent biofouling, scaling and corrosion by mechanical and biological means including high flow speeds, biological flocculation of colloids, and making the water entering the RO units inhospitable to bacteria and other organisms that cause biofouling, hence preventing their settlement and removing them with the brine. Recovery rate is lowered and energy is recovered to increase the energetic efficiency and minerals that are added to the product water are taken from the brine.

22 Claims, 11 Drawing Sheets

(51) Int. Cl.

| | | |
|---|---|---|
| *C02F 1/461* | (2006.01) | |
| *B01D 61/02* | (2006.01) | |
| *B01D 61/04* | (2006.01) | |
| *B01D 61/06* | (2006.01) | |
| *B01D 61/08* | (2006.01) | |
| *B01D 65/02* | (2006.01) | |
| *B01D 65/08* | (2006.01) | |
| *C02F 1/32* | (2006.01) | |
| *C02F 1/44* | (2006.01) | |
| *C02F 101/30* | (2006.01) | |
| *C02F 101/12* | (2006.01) | |
| *C02F 1/00* | (2006.01) | |
| *C02F 1/24* | (2006.01) | |
| *C02F 1/467* | (2006.01) | |
| *C02F 1/78* | (2006.01) | |
| *C02F 3/06* | (2006.01) | |
| *C02F 3/10* | (2006.01) | |
| *C02F 3/22* | (2006.01) | |
| *C02F 3/34* | (2006.01) | |
| *C02F 103/08* | (2006.01) | |

(52) U.S. Cl.
CPC .......... *B01D 61/06* (2013.01); *B01D 61/08* (2013.01); *B01D 65/02* (2013.01); *B01D 65/08* (2013.01); *C02F 1/32* (2013.01); *C02F 1/441* (2013.01); *C02F 1/461* (2013.01); *C02F 3/301* (2013.01); *B01D 2311/04* (2013.01); *B01D 2311/06* (2013.01); *B01D 2311/08* (2013.01); *B01D 2321/04* (2013.01); *B01D 2321/12* (2013.01); *B01D 2321/2033* (2013.01); *C02F 1/001* (2013.01); *C02F 1/24* (2013.01); *C02F 1/445* (2013.01); *C02F 1/4674* (2013.01); *C02F 1/78* (2013.01); *C02F 3/06* (2013.01); *C02F 3/104* (2013.01); *C02F 3/223* (2013.01); *C02F 3/34* (2013.01); *C02F 2101/12* (2013.01); *C02F 2101/30* (2013.01); *C02F 2103/08* (2013.01); *C02F 2201/009* (2013.01); *C02F 2209/11* (2013.01); *C02F 2209/20* (2013.01); *C02F 2209/22* (2013.01); *C02F 2209/40* (2013.01); *C02F 2301/024* (2013.01); *C02F 2303/04* (2013.01); *C02F 2303/08* (2013.01); *C02F 2303/10* (2013.01); *C02F 2303/16* (2013.01); *C02F 2303/20* (2013.01); *C02F 2303/22* (2013.01); *Y02W 10/15* (2015.05); *Y02W 10/30* (2015.05)

(56) References Cited

U.S. PATENT DOCUMENTS

| | | | |
|---|---|---|---|
| 4,351,722 A | | 9/1982 | Mixon |
| 4,363,703 A | * | 12/1982 | ElDifrawi .............. B01D 3/346 |
| | | | 159/904 |
| 5,006,786 A | * | 4/1991 | McKubre ............... G01N 17/02 |
| | | | 204/404 |
| 5,151,187 A | | 9/1992 | Behmann |
| 6,106,718 A | | 8/2000 | Maneshin et al. |
| 7,311,839 B2 | | 12/2007 | Schulze-Makuch et al. |
| 2004/0134521 A1 | | 7/2004 | Liberman |
| 2005/0104481 A1 | * | 5/2005 | Sunaba ................. H03H 9/1021 |
| | | | 310/348 |
| 2005/0211644 A1 | | 9/2005 | Goldman |
| 2009/0272695 A1 | * | 11/2009 | Blumenthal ......... B01D 61/025 |
| | | | 210/747.6 |
| 2010/0018921 A1 | * | 1/2010 | Ruehr .................. B01D 61/025 |
| | | | 210/636 |
| 2010/0059358 A1 | | 3/2010 | Ritchey et al. |
| 2011/0044824 A1 | | 2/2011 | Kelada |
| 2012/0080374 A1 | * | 4/2012 | Komor ..................... C02F 1/78 |
| | | | 210/603 |
| 2012/0193287 A1 | | 8/2012 | Brouwer et al. |
| 2013/0032533 A1 | * | 2/2013 | Libman ..................... C02F 9/00 |
| | | | 210/616 |
| 2013/0248375 A1 | | 9/2013 | Sanchez et al. |

FOREIGN PATENT DOCUMENTS

| | | |
|---|---|---|
| CN | 101215072 | 7/2008 |
| EP | 0585036 | 3/1994 |
| JP | 2003112181 | 4/2003 |
| JP | 2004025018 | 1/2004 |
| WO | WO2006/057249 A1 | 6/2006 |
| WO | WO2011/026521 | 3/2011 |

OTHER PUBLICATIONS

International Search Report, dated Aug. 9, 2012, which issued in PCT/IB2011/054739.

Combined Search and Examination Report, dated Mar. 1, 2011, which issued in UK application No. GB1101717.5.

Flemming et al., "Biofouling . . . the Achilles heel of membrane processes", Desalination, Elsevier, Amsterdam, NL, 113:2-3:215-225 (Nov. 30, 1997).

Hu., J. Y., et al., "Biofiltration pretreatment for reverse osmosis (RO) membrane in a water reclamation system," Center for Water Research, Department of Civil Engineering, National University of Singapore, Chemosphere 59 (2005), p. 127-133.

Mendoza-Espinoza, L., et al., "A review of Biological Aerated Filters (BAFs) for Wastewater Treatment", Environmental Engineering Science 1999, vol. 16, No. 3, pp. 201-216.

* cited by examiner

CHEMICAL FREE AND ENERGY EFFICIENT DESALINATION SYSTEM

This application is a continuation of U.S. application Ser. No. 13/982,748, filed Jul. 30, 2013, now U.S. Pat. No. 9,162,911, which is hereby incorporated by reference in its entirety.

BACKGROUND

1. Technical Field

The present invention relates to the field of desalination, and more particularly, to an easy to operate, environment friendly reverse osmosis desalination system.

2. Discussion of Related Art

Overcoming water shortage often requires desalinating water at a high energy expense and at high environmental prices resulting from added chemicals which are returned to the environment.

For example, in reverse osmosis desalination, chemicals are added to the feed seawater to prevent scaling and fouling in the membranes. Such chemicals may include acids and pH regulators, ferric compounds, various antiscalants (scale inhibitors), chlorine, various biocides (e.g. algae killing compounds), etc. Some of the antiscalants serve as nutrients to algae and bacteria, and hence increase biofouling. Some of the chemical additives in the pre-treatment stage are then neutralized by chemicals added at the post treatment stage. Some of the membrane cleaning chemicals are dangerous chemicals, and much of them is expelled in the brine exiting the desalination plant, causing environmental problems. Moreover, some of these materials may reach the final product in cases of local failures in the membrane or in the membrane flushing process.

Handling these chemicals requires extensive logistic efforts and solving of various environmental problems. These difficulties render desalination plants to be large and remote from residential areas to which they supply water.

WIPO Publication No. 2006/057249 discloses a reverse osmosis (RO) system with a pretreatment unit combining a biological active carbon column and a microfilter or an ultrafilter to remove suspended particles, organic matter and microorganisms from the seawater.

BRIEF SUMMARY

One aspect of the invention provides a desalination system comprising an intake unit pumping seawater via an intake pipeline and providing the pumped seawater to a pre-treatment unit connected to a reverse osmosis (RO) desalination unit, the desalination system characterized in that: the desalination system is operable under avoidance of any external addition of chemicals, the chemical-free operability achieved by the following: the intake unit is arranged to operate at a flowing speed between 1.5 and 3 m/sec in the intake pipeline to prevent settling of larvae in the intake pipeline, the pre-treatment unit comprises an upflow biological flocculator and a downflow filter, and is arranged to supply the seawater to the upflow flocculator at a flowing speed between 15 and 60 m/hour, the biological flocculator comprises a layer of porous particles arranged to mechanically support biofilm generation to bind and flocculate colloids from the water without adding coagulants or flocculants of any type to the water, wherein the pre-treatment unit is further arranged to separate floc from the porous particles, and wherein a height and a composition of the downflow filter are selected to reduce an oxygen level below saturation in the pretreated water, and remove remaining floc, to suppress microbial attachment and growth in the RO unit.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which.

DETAILED DESCRIPTION

Figure 1:
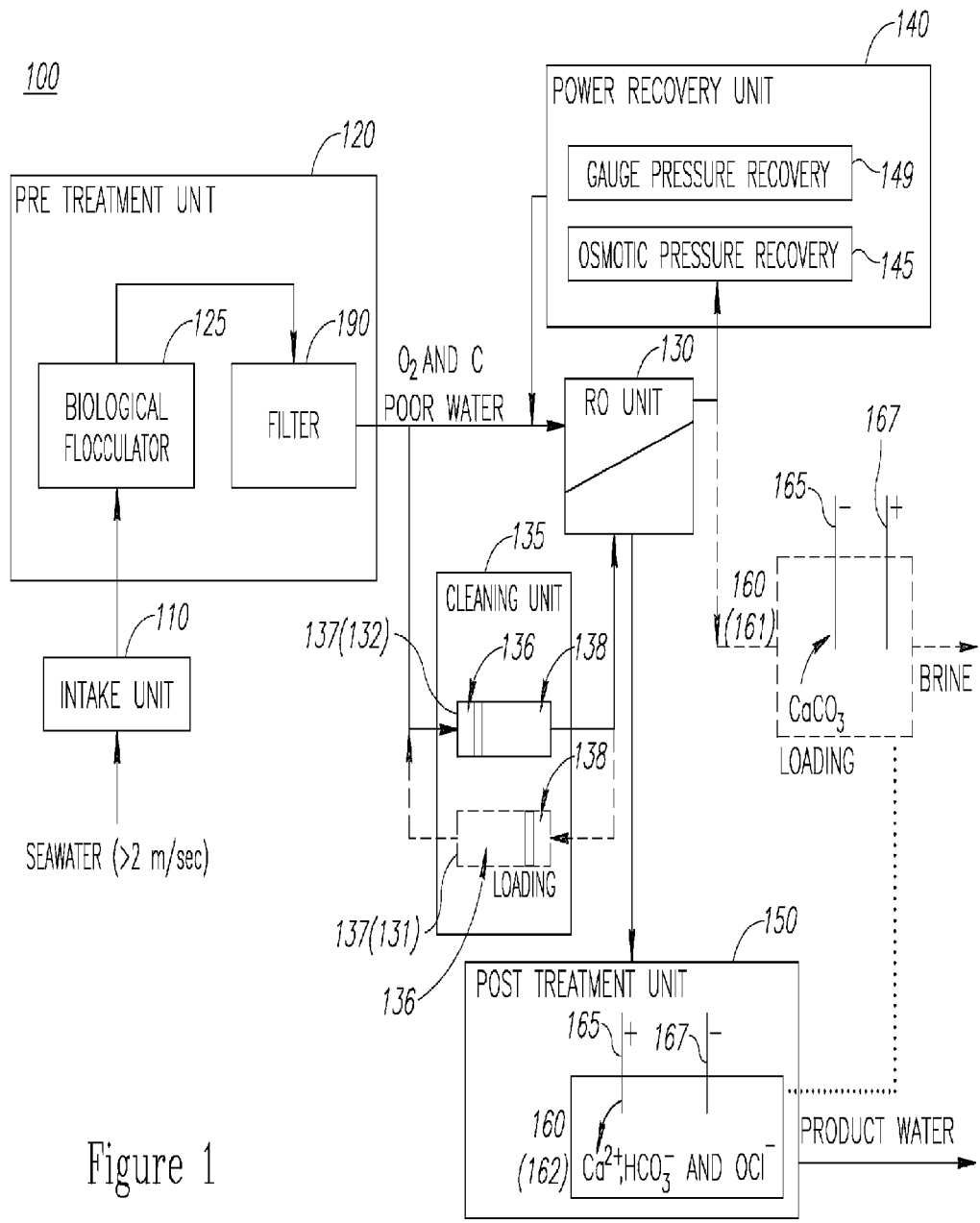
FIG. 1 is a high level schematic block diagram of a desalination system according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Inventors have taken a new approach to prevent fouling, scaling and corrosion in a reverse osmosis desalination system, an approach that avoids using added chemicals, in order to simplify the operation logistics and costs, and to allow economically efficient desalination system at a smaller scale, and in proximity to urban areas.

The new approach starts from the biological origin of much of the fouling, scaling and corrosion in the membranes. Accordingly, the environmental conditions in the desalinated water are set to be inhospitable in order to suppress bacterial growth and bacterial attachment to the membranes. These environmental conditions include a low oxygen level, that is intermediate between aerobic conditions (with electrochemical corrosion) and anaerobic conditions (with biological corrosion), and a low biologically available carbon level that provides little nutrition to bacteria. This approach separates most of the organic and mineral matter before the desalination membranes, and generates inhospitable conditions in the membranes for the development of bacteria that have come through the membrane. An additional advantage of not adding chemicals in the pretreatment, is the avoidance of problems that require addition of other chemicals to neutralize (e.g. sodium bisulfite neutralizes chlorine, soda neutralized acids).

In particular, organic and mineral colloids in the intake water are generally hard to separate, and require adding chemicals such as coagulants and flocculants to remove the colloids from the water in the prior art. The current invention uses biological organisms to coagulate and flocculate the colloids. This is contrary to prior art approaches that prevent any biological growth in the filtration media.

In one example, the biological organisms are cyanobacteria and coccid bacteria, which coagulate organic and mineral colloids and develop on certain types of media, such as tuff and/or expanded clay. These organisms cover the media in a biological flocculator (see below). They also produce substances that expand from the coating of the bacteria and capture biologically degradable organic matter that serves as nutrients, as well as matter which is not biologically degradable, but remains attached to the bacteria. The continuous cleaning of the media (e.g. by mixing and stirring the media in the flocculator causing floc removal) causes the bacteria to regenerate these glue-like substances and maintain the biological activity of the organisms— biological flocculation is maintained active. The inventors have found that cyanobacteria and coccid bacteria cover the flocculation media at various depths in the media, and are kept clean by the mixing procedures that are presented below.

Figure 2:
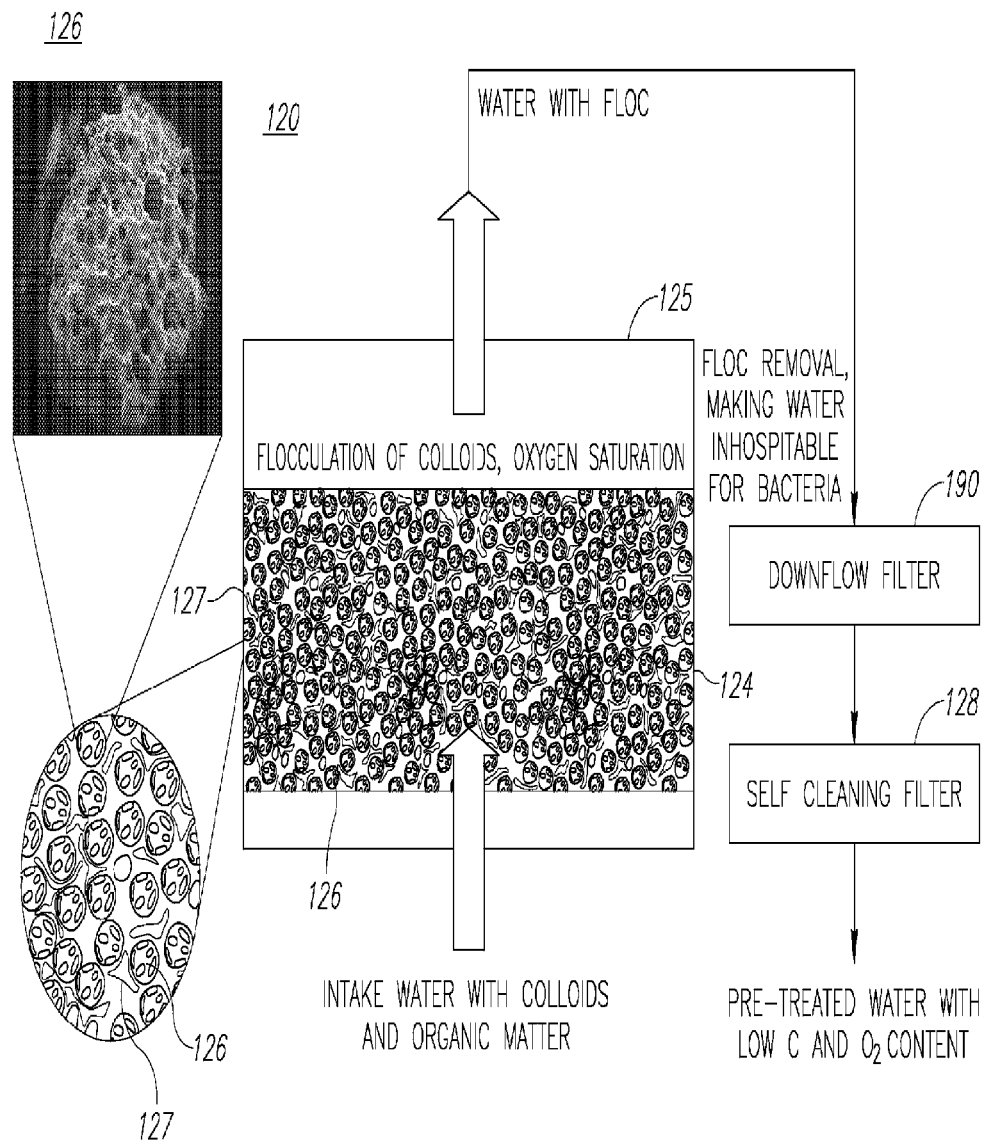
FIG. 2 is a high level schematic block diagram of a pre-treatment unit according to some embodiments of the invention.
Figure 6A:
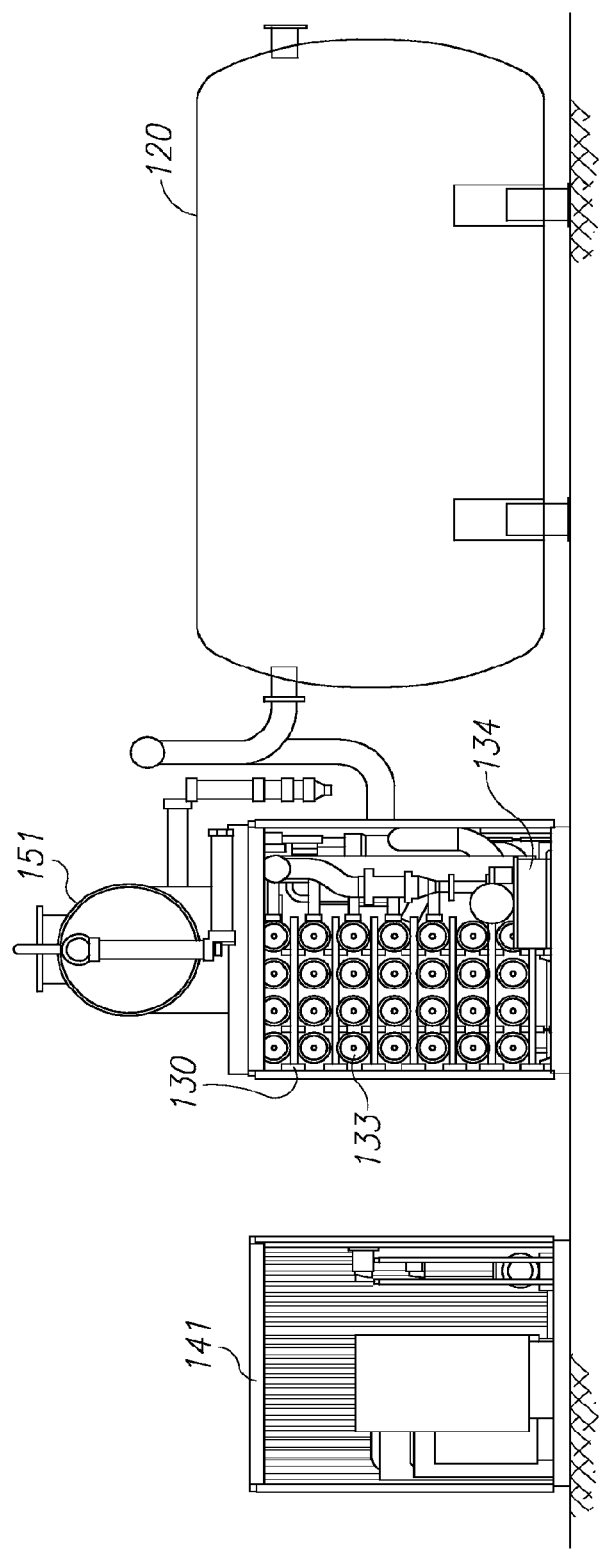
FIGS. 6A and 6B are schematic illustrations of the system in cross section (FIG. 6A) and perspective (FIG. 6B) views, according to some embodiments of the invention.
Figure 6B:
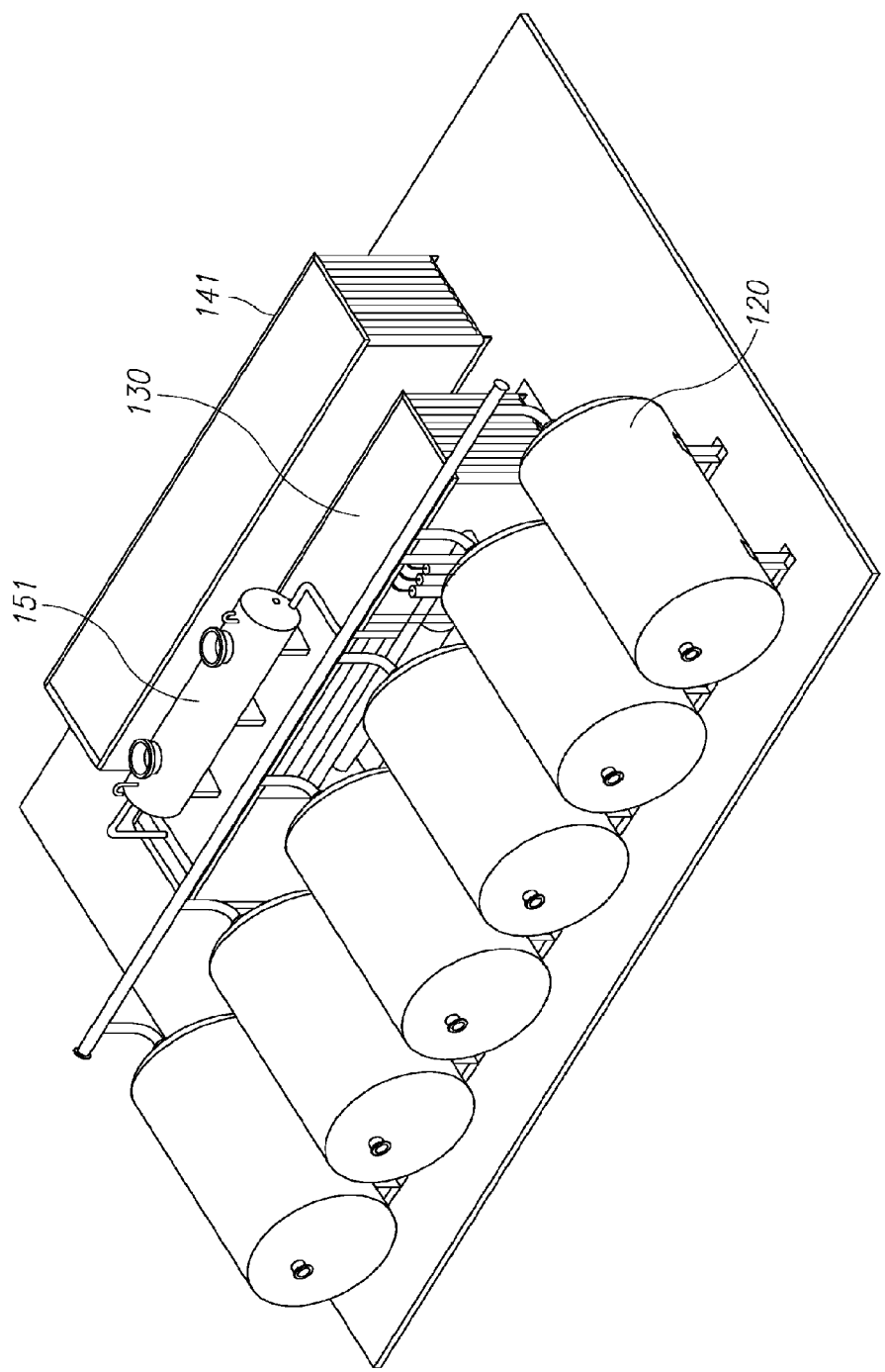

FIG. 1 is a high level schematic block diagram of a desalination system 100 according to some embodiments of the invention. Desalination system 100 comprises an intake unit 110, a pre-treatment unit 120, a reverse osmosis (RO) desalination unit 130, and a post treatment unit 150. FIG. 2 is a high level schematic block diagram of a pre-treatment unit 120 according to some embodiments of the invention. FIGS. 3A-3D illustrate the structure and function of the pre-treatment unit according to some embodiments of the invention. FIGS. 4A-4F illustrate floc and bacterial film on porous particles according to some embodiments of the invention. FIGS. 6A and 6B are schematic illustrations of desalination system 100 in cross section (FIG. 6A) and perspective (FIG. 6B) views, according to some embodiments of the invention.

Intake unit 110 is arranged to pump seawater via an intake pipeline 111 and supply the pumped seawater at a flowing speed larger than a specified intake threshold speed (e.g. 2 m/sec, or between 1.5 and 3 m/sec) selected to prevent settling of larvae in intake pipeline 111 and in intake unit 110. Specifically, intake unit 110 does not introduce chlorine into the supplied sea water.

Pre-treatment unit 120 is illustrated in FIG. 2. Pre-treatment unit 120 is arranged to generate an oxygen content lower than an $O_2$ threshold, and an amount of accessible organic carbon lower than a C threshold in the pre-treated water. Pre-treatment unit 120 specifically avoids adding iron disulfides, coagulants, flocculants, and antiscalants to the pre-treated water. Pre-treatment unit 120 may comprise Multi Media Filters (MMFs) that include anthracite and sand filtration layers.

Pre-treatment unit 120 comprises an upflow biological flocculator 125 operating with an upwards directed flow, a downflow filter 190 and optionally a self-cleaning filter 128.

Biological flocculator 125 is arranged to flocculate organic and mineral colloids in seawater using biological organisms building up in the filter. While colloids in the sea water are removed chemically in prior art (as they otherwise cause fouling in the membranes) the proposed chemical free system flocculates the colloids, i.e. removes the colloids suspended in the water into a form of flakes, or floc that are suspended in the water. Flocculator 125 is arranged to maintain an environment that is naturally super saturated with oxygen, e.g. flocculator 125 may be continuously aerated to maintain the water saturated or over-saturated with oxygen, to support organismal growth. The organisms in biological flocculator 125 gather the colloids as nutrients, e.g. by forming a biofilms. The organic matter is removed from biological flocculator 125 as floc consisting of biofilms, organisms and bound colloids.

Downflow filter 190 then removes the flakes from the water (it does not efficiently remove colloids from sea water). While flocculator 125 operates at least at oxygen saturation (e.g. between 8 and 10 ppm), filter 190 reduces the oxygen level in the water below saturation e.g. down to 7 ppm, 4 ppm, or 2 ppm, depending on the specific configuration of pre-treatment unit 120 and the input water quality. Another specification for filter 190 may be to reduce oxygen level in the water to 50-70% of the oxygen saturation value. The lowered oxygen level in the water transferred to RO unit 130 reduces significantly, or prevents the biological activity in the sea water and further reduces corrosion in the pipework.

Figure 3A:
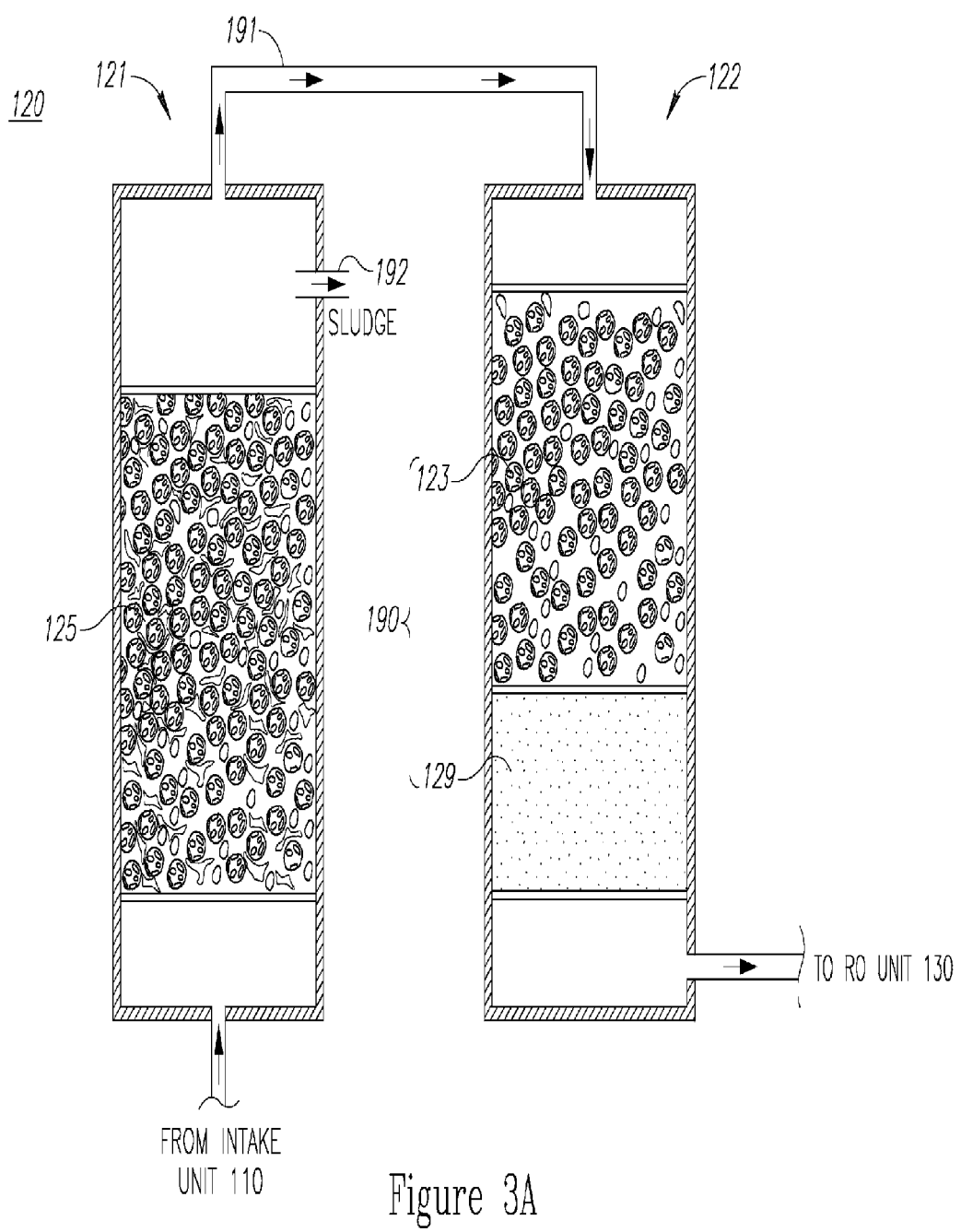
FIGS. 3A-3D illustrate the structure and function of the pre-treatment unit according to some embodiments of the invention.
Figure 3B:
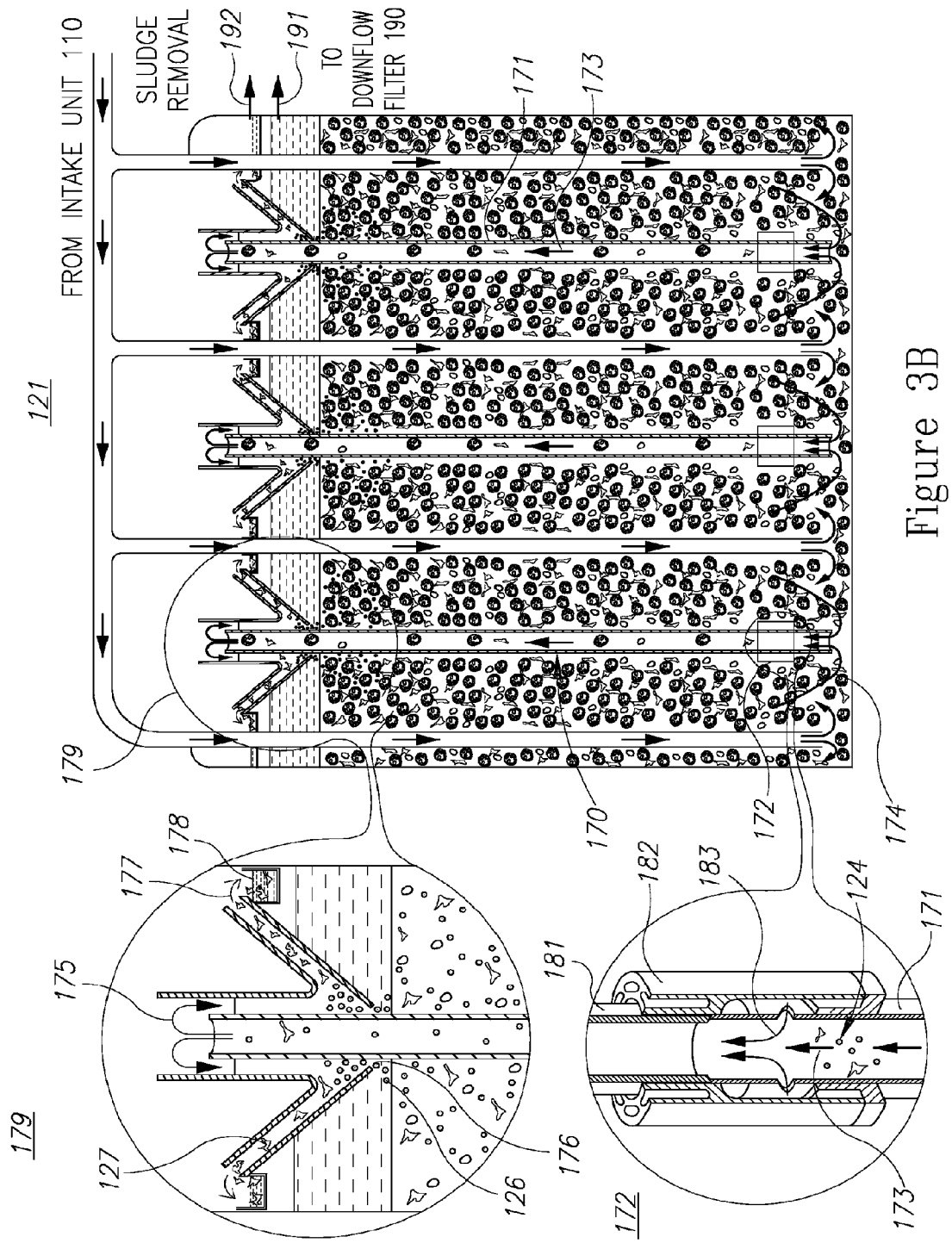
Figure 3D:
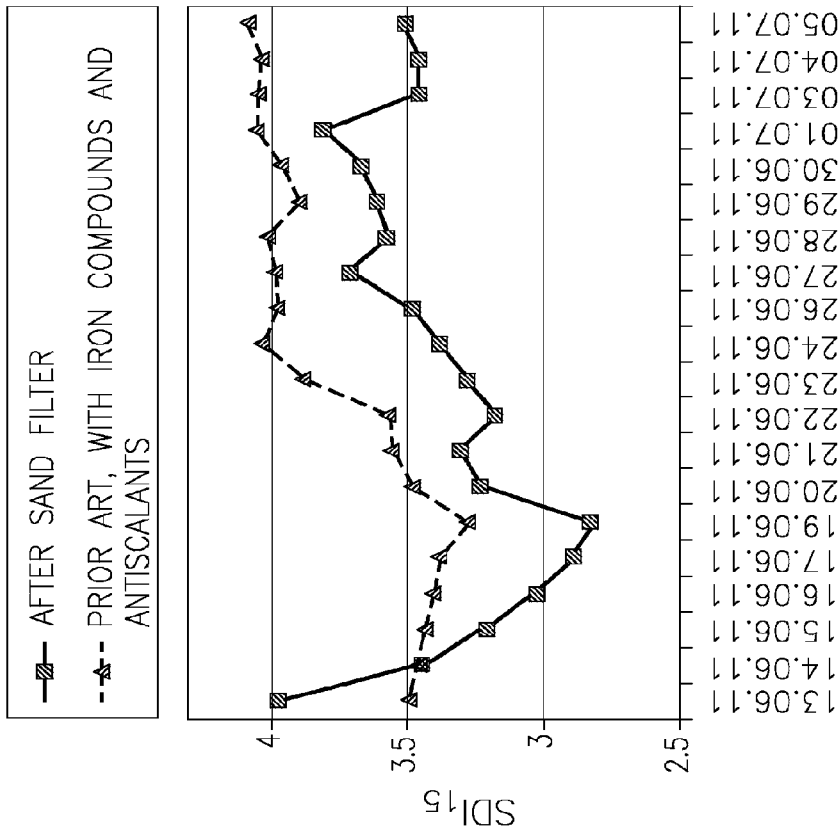
Figure 3C:
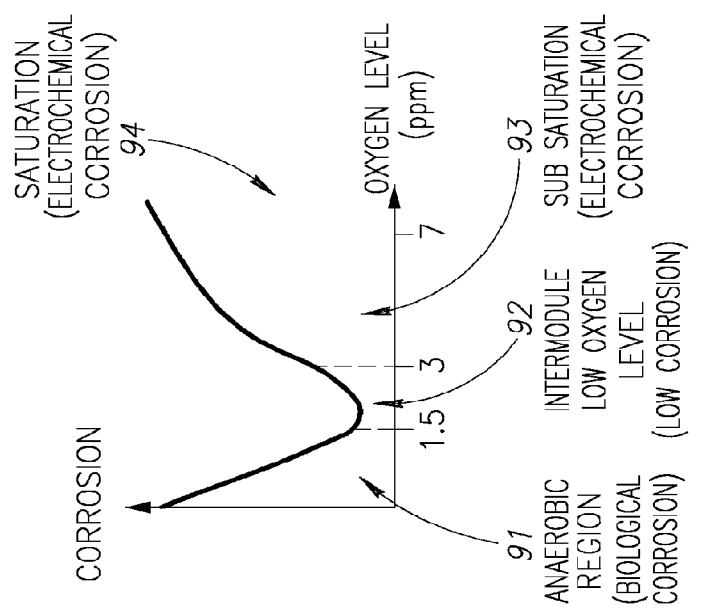

FIG. 3C illustrates schematically the effect of the oxygen level in the water on corrosion of the metal parts in RO unit 130. The range of oxygen levels is schematically divided into four regions: anaerobic region 91—substantially anaerobic conditions with biological corrosion (up to ca. 1.5 ppm); low oxygen level region 92—an intermediate region with low corrosion (between ca. 1.5 and 3 ppm); sub-saturation region 93—aerobic conditions but significantly below oxygen saturation levels with electrochemical corrosion (between ca. 3-7 ppm, depending on water conditions); and saturation region 94—oxygen saturation or super-saturation in the water, with intense electrochemical corrosion (above ca. 7 ppm).

Within sub-saturation region 93, corrosion strongly depends on the oxygen level, and by regulating the oxygen level with the configuration of downflow filter 190, corrosion may also be controlled in a chemical free manner. While oxygen saturation is maintained in flocculator 125 to support colloid flocculation, oxygen level and biologically accessible carbon levels are reduced in the water delivered to RO unit 130. The specific oxygen and carbon thresholds are still under research, and may be changed with accumulating practice. The inventors suggest that a 30% reduction of oxygen level may be enough to prevent biofouling by making the pre-treated water inhospitable to bacteria. Alternatively, an oxygen level of 3-4 ppm, or even 2-3 ppm may be effective.

Upflow biological flocculator 125 is arranged to receive the supplied sea water from below at a flowing speed larger than a specified pre-treatment threshold speed (e.g. 50-60 m/hour, or between 15 and 70 m/hour). Flocculator 125 comprises a layer of porous particles 124 arranged to mechanically support bacterial film generation in order to yield biological flocculation of organic material thereupon. Layer 124 is depicted schematically by illustration of porous particles 126 and bacterial film 127 supported by porous particles 126. Bacterial film 127 removes by adhesion various colloids, organic material, and microorganisms entering flocculator 125 with the sea water. The upward flow in flocculator 125 prevents compaction of layer 124, hence keeping the biological film available and operable. In addition, bacterial film 127 mineralizes some of the organic material. Impacts between particles 126 in layer 124, occurring due to the upflow of supplied sea water, promotes the mechanical destruction of algae.

Layer 124 is schematically illustrated in FIG. 2 (as well as in FIGS. 3A and 3B) as a texture composed of porous particles 126 and floc 127 (floc 127 being parts of bacterial film 127 that are removed from the system). A micro photo in FIG. 2, taken by a scanning electron microscope, illustrates the porous structure of particles 126 in the case of ground tuff. For illustration purposes only, particles 126 are depicted in the texture as being much larger than their actual size, which is a few millimeters. The detailed illustration in FIG. 3B depicts particles 126 as being smaller. A texture of sand in FIG. 3A is taken as points to distinguish between sand and porous particles 126, although the actual particle sizes may be similar or only slightly larger. The different textures are not to be taken as indicating particle size.

A specific design of pre-treatment unit 120 is presented in FIG. 3A. Biological flocculator 125 comprises an upflow section 125 in container 121. Downflow filter 190 in a second container 122 may comprise a downflow coarse filter 123 characterized by coarse and porous particles that are relatively light, positioned above a fine filter 129 characterized by finer and heavier particles. The aim of this configuration is to trap remaining floc in coarse filter 123 to prevent blockage of fine filter 129 with an upper sludge layer.

For example, coarse filter 123 may be similar in composition to biological flocculator 125, fine filter 129 may comprise a sand or ground basalt filter. More generally, coarse filter 123 may comprise particles with a specific gravity around 2.4, in respect to particles in finer filter 129 that may have a specific gravity of 2.4. Examples for materials of coarse filter 123 are expanded clay, ground tuff, activated carbon and anthracite.

Generally, downflow filter 190 may be any multimedia filter, or a single media filter, depending on the specific configuration of the system.

Overflow from container 121 moves (191) into container 122. Sludge, i.e. water with floc, may be removed (192) from container 121 or from the water transferred to second container 122. Containers 121, 122 are presented schematically, and may each comprise several containers interconnected with appropriate pipework and managed according to an appropriate temporal plan.

FIG. 3B presents a more detailed design of container 121, in which airlift pumps 170 are used to mix and aerate biological flocculator 125 to support organismal growth and remove the generated floc. Mixing the media (particles 126 in flocculator 125) facilitates both the maintenance of oxygen saturation in flocculator 125 and the regeneration of the biofilms activity of flocculating colloids (as explained above).

Pipes 171 are vertically inserted into container 121 and air is injected 172 at their immersed bottoms (see lower detailed illustration in FIG. 3B). Air is injected (183) from air pipes 181 connected to pipes 171 through injection units 182. Injected air 183 causes an upwards motion 173 of the water in pipe 171 which mixes the substrate, sucks in 174 water at the pipe bottoms, and moves floc 127 upwards. At the tops 179 of pipes 171 (see top detailed illustration in FIG. 3B), water and filter substance—particles 126 from layer 124—emerges 175, and is gravitationally separated into particles 126 recovered through an opening 176 to layer 124, water that is transferred 191 to downflow filter 190 container 122, and floc 127 (in water) that is delivered 177 over channels 178 to a sludge treatment unit (not shown). The sludge treatment unit may include clarification stages, such as a dissolved air flotation (DAF) tank or lamella separators, to remove floc, especially in cases of large amounts of organic material in the seawater. Generally, water from container 121 may be delivered to container 122 with or without intermediate floc removal.

Figure 4C:
FIGS. 4A-4F illustrate floc and bacterial film on porous particles according to some embodiments of the invention.
Figure 4F:
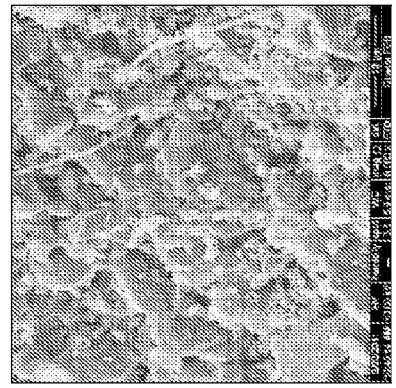
Figure 4B:
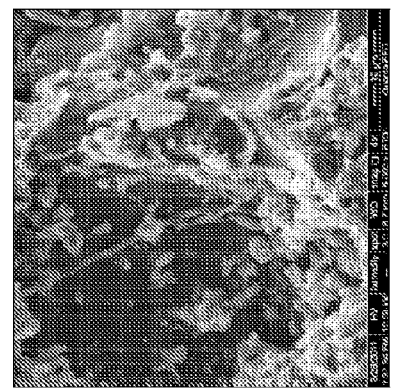
Figure 4E:
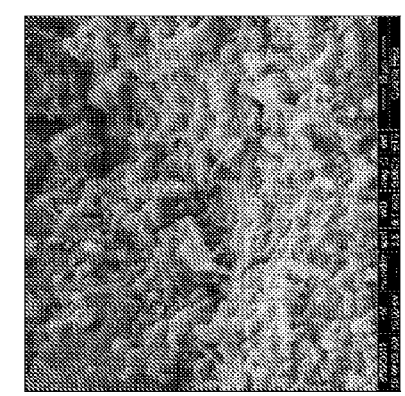
Figure 4A:
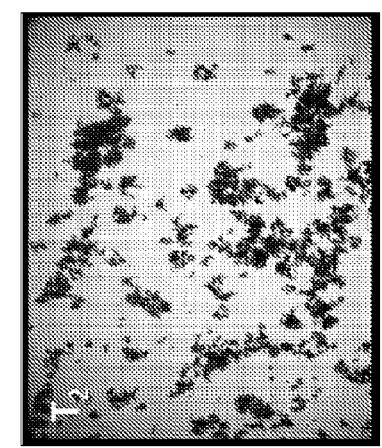
Figure 4D:
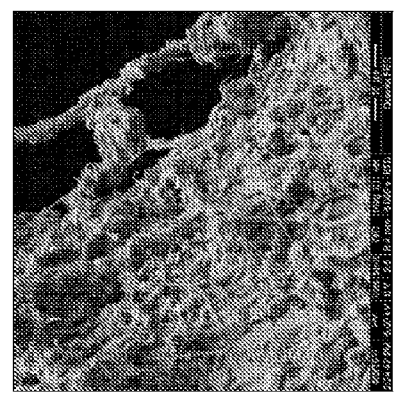

FIGS. 4A-4F illustrate floc and bacterial film on porous particles according to some embodiments of the invention. FIG. 4A illustrates floc in water removed from flocculator 125. In contrast to the invisible colloids in the intake water, the floc produced by the bacterial film is separable from the water without use of chemical means. FIGS. 4B-4F illustrate bacterial film 127 upon porous particles 126 in different depth in flocculator 125. While FIG. 4B illustrates reduced bacterial growth on less porous media (Filtralite, at 50 cm depth), FIGS. 4C-4F illustrate much stronger growth of bacterial film of ground tuff as the filter media (in depths of 20 cm, 100 cm, 200 cm and 300 cm, respectively).

The extent of floc removal by pre-treatment unit may be expressed by a carbon threshold, which may be set at ca. 2-2.5 ppm of biologically available carbon, or total organic carbon (TOC). Alternative measures may be a turbidity below 0.2-0.5 NTU (nephelometric turbidity unit) or a reduction of chlorophyll levels by 80-90%.

While airlift pumps 170 separate floc 127 from porous particles 126, floc 127 itself may be either separated from the water emerging from flocculator 125, or be transferred with the water for separation in downflow filter 190. In one example, a large amount, e.g. 80-90%, of floc 127 may be removed from the emerging water and a residual amount of floc 127 may be removed within a coarse part of downflow filter 190. Floc removal may be carried out in different ways such as with or without sludge removal 192, and with different constructions of downflow filter 190. The exact values of both oxygen and carbon thresholds may depend on the levels of other nutrients in the pre-treated water, to temperature, sea conditions, etc.

In the described configuration, upflow biological filter 125 may be any type of flocculator, that absorbs colloids from the sea water and turns the colloids into floc, and allow at least a partial separation of floc 127 from the water. Downflow filter 123 further flocculates colloids, but also consumes oxygen in the water to reduce the oxygen level. Oxygen consumption is maintained due to lack of aeration. Downflow biological filter 123 may be structurally integrated with sand filter 129 as a downflow filter unit. Flow rate through upflow filter 125 may be larger (e.g. 50-60 m/hour) than the flow rate through the downflow filter unit (e.g. 10 m/hour), in order to provide for the turbulence and aeration of upflow filter 125 and intermediate floc removal.

In one experiment, oxygen level in flocculator 125 was constant at 10 ppm due to the constant aeration by airlift pumps 170 (see below), and was reduced along downflow filter 123 to 6-7.5 ppm. In the consequent downflow sand filter 129, the oxygen level was further reduced, in one experiment to ca. 4 ppm.

The exact values are determined by the extent of aeration, materials sizes and heights (layer thicknesses) of filters 125, 123 and 129, as well as by the quality of water, flow speeds and other factors. For example, in one experimental configuration, in which both biological filters (upflow flocculator 125 and downflow filter 123) include ground tuff, the diameter of containers 121, 122 is ca. 1 meter, and the layer thicknesses (filter heights, or depths) are 3 meters, 2.4 meters and 60 centimeters for filters 125, 123, and 129 respectively. In another example, downflow filter 123 includes ceramic particles 126 (of the brand Filtralite, see below) and its height is reduced to 80 cm. In general, the height and the composition of the filtering layer in downflow filter 190 are selected to reduce an oxygen level below saturation in the pretreated water and remove remaining floc, in order to suppress microbial attachment and growth in the pretreated seawater.

FIG. 3D illustrates the reduction of organic matter in the seawater in comparison to a prior art facility, in which ferric and ferrous compounds are added to remove colloids, resulting in an acceptable level of organic matter. The results of the experiment carried over several months are presented in terms of $SDI_{15}$ —15 minutes silt density index, which is a common measure in the field. While, in one experiment, upflow biological filter 125 still holds large amounts of organic matter (due to the stage of floc creation) represented in a high $SDI_{15}$, water exiting downflow sand filter 129 have about the same level of organic matter as chemically-treated water. Hence, flocculator 125 may achieve a similar level of organic matter removal as added chemical flocculation agents do. These results were achieved in a preliminary experiment, and are not to be taken as construing the current invention. Clearly, the structure and parameters of pre-treatment unit 120 are to be adapted to the quality and amounts of incoming water, and specific site requirements.

Another measure for the filtration level and carbon content is the turbidity which is measured in Nephelometric Turbidity Units—NTU. In several experiments, the turbidity of water exiting downflow filter 190 in several configurations was found to be similar to the turbidity of water exiting a chemical pre-treatment unit in a prior art desalination system over experimental periods of several months, in which the turbidity of both system fluctuated between 0.1 and 0.6 NTU due to seawater conditions. Corresponding $SDI_{15}$ values recorded during these periods were similar between the suggested chemical free pre-treatment unit 120 and the prior art pre-treatment units using antiscalants and ferric compounds, and fluctuated between $SDI_{15}$ values of 2.5 and 3.5. Additional results that are not presented in the current disclosure indicate the development of the organismal communities at different depths in filters 125 and 123 and the continuous reduction of $SDI_{15}$ values along downflow filter unit 190 combining filter 123 and sand filter 129, reaching ca. 0.4 per meter in downflow filter 123 in one experiment. Additional results include the floc development in upflow filter 125. In one experiment, floc sizes average 0.3 and reached well over 1 mm. Floc size may serve as an indication of filter efficiency and as a parameter for planning pre-treatment unit 120 for specific conditions.

Porous particles 126 in layer 124 may be microporous and have an extended surface area and may comprise ground tuff, expanded clay, activated carbon, ceramic particles and/or zeolite. Tuff is received from a natural source and is ground to the required optimized particle size. Ceramic particles are available at different physical characteristics. Several types of commercially available ceramic particles (e.g. Macrolite, Filtralite) were tested for the biological filter material in comparison to ground tuff. Zeolites are the aluminosilicate members of the family of microporous solids known as molecular sieves, and may constitute an inner surface area of hundreds of $m^2$ per gram. Several types of commercially available zeolites (e.g. Clinoptilolite—hydrated Sodium Potassium Calcium Aluminum Silicate, Chabazite—hydrated Calcium Aluminum Silicate) were tested for the biological filter material and compared to ground tuff. Various characteristics of filter material are drawn into consideration—primarily pore size and effective particle area, but also durability and mechanical strength, particle size, chemical composition and solubility.

Downflow filter 123 may be constructed similarly to upflow filter 125 from a layer of porous particles, even though their operation (flow regime and aeration conditions) is different. The type of porous particles 126 may however differ between filters 125, 123.

Downflow sand filter 129 is arranged to receive the sea water from upflow biological filter 125 or downflow filter 123 and remove flocculated organic material therefrom. Parts of bacterial film 127 that might be released from flocculator 125 are easily intercepted by sand filter 129 as they are substantially larger than the colloids entering with the sea water. As a result, the level of available organic material in the pre-treated sea water is reduced significantly. Downflow sand filter 129 also promotes biological mineralization of the organic material, thereby diminishing the amount of nutrients in the water and reducing the oxygen content. In one experiment, downflow sand filter 129 reduced the oxygen level in the sea water to 4 ppm.

Overall pre-treatment unit 120 significantly reduces the levels of both oxygen and organic material, thereby chemotactic preventing microorganisms to settle in RO desalination unit 130. As the membrane RO desalination unit 130 does not constitute a significant mechanical barrier to microorganisms, they pass through the system and are removed from the product water by disinfection. The low oxygen level also allows the use of low PREN (Pitting Resistance Equivalent Numbers) stainless steel in the high pressure piping, without causing corrosion damage.

Using porous particles 126 to support bacterial films 127 that carry out biological flocculation allows the avoidance of using iron as flocculation agent, thereby reducing scaling.

The inventors have discovered, that the configuration of pre-treatment unit 120 allows the membrane elements in RO unit 130 to stay scale free and unobstructed, without need to add iron, disulfides, coagulants, flocculants and antiscalants to the pre-treated water as is the common practice which is also accompanied by extensive efforts to supply, regulate and dispose these chemicals.

RO desalination unit 130 is arranged to receive the pre-treated sea water from pre-treatment unit 120 (at high pressure generated by a high pressure pump 134) and extract product water (into permeate suck back tank 151) and brine therefrom. RO desalination unit 130 may be further associated with an energy recovery unit 140, arranged to recover energy from the brine. Energy recovery unit 140 may recover energy from either the gauge pressure of the brine by a gauge pressure exchanger 149 (e.g. DWEER or ERI), the osmotic pressure of the brine by an osmotic pressure exchanger 145, such as a direct osmosis unit arranged to recover osmotic pressure of the brine, or both.

RO desalination unit 130 may be arranged to operate at a recovery rate lower than a specified threshold (e.g. 43-48% in comparison to a maximal recovery rate 50-53%, i.e. a ca. 10% reduction), to enable a specified reduction in the input pressure of the supplied sea water (thereby reducing energy consumption) and a specified reduction in brine salinity (thereby reducing environmental damage and dilution efforts). The lower recovery rate also reduces the scaling in RO unit 130. Flow through system 100 may be regulated and controlled via unit 141 associated with the facility.

RO desalination unit 130 may be configured to operate at a maximal product water to energy use ratio and be optimized energetically. For example, the inventors have found out that a configuration of eight membrane elements per pressure vessel 133 optimizes the operation of RO desalination unit 130 in these aspects, and maximizes feed pressure of 45-50% recovery while using a single stage.

RO desalination unit 130 may be associated with a cleaning unit 135 arranged to back wash the RO membranes periodically to remove scaling nuclei. The inventors have found that avoiding the addition of Fe at the pre-treatment stage reduces significantly the extent of scaling, such that periodical washing of scaling nuclei and microcrystals from the membrane suffices to prevent scaling at larger scale, thereby sparing the usage of antiscalants.

Cleaning unit 135 may operate by periodically (e.g. daily) back washing the RO membrane, i.e. operating the RO membrane as a direct osmosis membrane. Reversing flow direction removes particles that accumulate near the membrane.

Cleaning unit 135 may be a direct osmosis cleaning unit 135 and comprise a back wash unit 137 that is arranged to deliver, utilizing a gauge pressure of the pre-treated water, product water to at least one RO desalination element (e.g. pressure vessel 133, FIG. 5) within RO desalination unit 130 at a back wash gauge pressure lower than the gauge pressure of the pre-treated water, to temporarily back-wash the RO desalination elements with the delivered product water.

Back wash unit 137 may comprise a piston with a sea water chamber 136 and a product water chamber 138. Sea water chamber 136 may be filled with the gauge pressurized pre-treated water, whereas product water chamber 138 may be filled with product water. Upon actuation (state 132), the gauge pressure of the pre-treated water may be utilized to deliver the product water from chamber 138 at a pressure lower than the pre-treated water's gauge pressure to RO desalination elements in RO unit 130. The pressurization of the product side in the RO desalination elements causes a reversal of flow direction over the semi-permeable membrane, as the sea water has a higher osmotic pressure than the product water, with product water moving against the gauge pressure gradient. After back-washing the membrane, the low gauge pressure of exiting product water may be used to fill chamber 138 (state 131) after removing the gauge pressure from the pre-treated water in chamber 136, in order to recover back wash unit 137.

Back wash unit 137 may be part of power recovery unit 140. For example, when power recovery unit 140 comprises a periodically back washed forward osmosis unit (not illustrated), back washing the RO elements may be carried out in relation to back washing the forward osmosis membrane elements (e.g. simultaneously or sequentially).

Direct osmosis cleaning unit 135 and back wash unit 137 may be constructed according to principles taught by WIPO Publication No. WO2004062774, i.e. by feeding concentrated saline solution to the feed side of the RO membrane under the high gauge pressure of the normal RO separation process; feeding dilute saline solution to the permeate-side of the RO membrane under higher pressure than the permeate pressure of the normal RO process, so that a net driving differential pressure is directed to the feed-side, whereby the solvent is being sucked from the permeate-side to the feed-side, penetrates into the interface between the membrane and the accumulated foulant, and separates the foulant from the membrane surface; and withdrawing the concentrated saline solution together with the separated foulant and the penetrated solvent from the feed side of the RO membrane.

In particular, direct osmosis cleaning unit 135 and back wash unit 137 may be added to system 100 to remove bacteria, originating from the pre-treatment unit 120, from the RO membranes. Using back wash unit 137 may allow using a less expensive pre-treatment method (ground tuff instead of activated carbon porous particles 126) and compensate for the bacteria that were not removed in the pre-treatment. Back wash unit 137 may operate daily to remove bacteria from the membranes, and thus allow using the biological treatment although it may generate a high content of bacteria on the pre-treated water.

Post treatment unit 150 is arranged to disinfect the product water. Post treatment unit 150 may utilize any of the following methods for carrying out the disinfection: UV radiation, electrolysis and ozone. Chlorine may be electrically produced in post treatment unit 150. For example, chlorine may be produced from the brine or chlorine may be produced from chlorides in the product water (see below), to support product water disinfection.

Post treatment unit 150 may comprise an electrolytic unit 160 arranged to load an electrode 165 operating as a cathode with $CaCO_3$ from the brine (stage 161, in respect to electrode 167 operating as an anode), and operate loaded electrode 165 as an anode in the product water (stage 162, in respect to electrode 167 operating as a cathode) to release $Ca^{2+}$ and $HCO_3^-$ to the product water and further generate free chorine from chlorides in the product water, wherein the generated free chlorine is usable to disinfect the product water. For example, electrode 165 may be an inner side of a cylinder, and electrode 167 may comprise electrodes placed within the volume of the cylinder. The operative voltages between electrodes 165 and 167 may be 1-2 volts. Post treatment unit 150 uses electrolytic unit 160 to transfer minerals from the brine to the product water, as well as to produce free chlorine such as $OCl^-$ and chlorine ions from chlorides in the product water, without having to add chlorine externally. Loading stage 161 may be carried out by switching brine flow into electrolytic unit 160 followed by washing electrolytic unit 160 before product water is introduced into electrolytic unit 160 (stage 162).

The selected intake flowing speed, biological filter 125 and cleaning unit 135 are usable to spare external addition of chemicals to desalination system 100 and thereby spare associated chemicals' supply and storage demands. Thus, described desalination system 100 is operable in small scale and in proximity to urban regions, which otherwise prohibit the installation of chemical using desalination systems.

The new approach of the inventors is illustrated in Table 1 which presents the problems solved by the disclosed invention as well as further advantages. It should be noted that the main goal of avoiding the addition of chemicals is achieved by an integration of solutions of several elements in the desalination system, most notably in the pre and post treatment units, and involves a holistic view of the system. As shown in FIG. 3D and the experimental data, this approach achieves a product quality which is similar to that of the prior art product.

TABLE 1

Problems solved by the disclosed invention and further advantages

| Stage | Intake unit | Pre-treatment | RO unit | Post treatment |
|---|---|---|---|---|
| Prior art | Addition of chlorine | Addition of chemicals against scaling, biofouling and corrosion | Operation at maximal recovery rate | Neutralizing the added chemicals in the product water |
| Problems | Larvae settlement | Handling the chemicals, partial efficiency, some antiscalants induce biofouling as nutrients | High energy use, some scaling and fouling, high PREN steel required | Toxic brine and environmental consequences |
| Solution | High intake flow speed | Flocculator and filter - biological flocculation of the colloids and removal of the generated floc | Creation of inhospitable environment (low O and C levels), Operation at a reduced recovery rate, Power recovery | Chemical free disinfection and mineralization of product water, Brine without added chemicals |
| Advantages | Prevents settlement, no chemicals | No chemicals, efficient removal of colloids | Prevention of biofouling and scaling, lower energy consumption, use of lower PREN steel | No toxic output, no additional chemicals |

Focusing on added chemicals, Table 2 illustrates prior art added chemicals according to the confronted problem, and alternative solutions combined by the current invention to overcome these problems. The current invention approaches the problem holistically, solving specific problems at the level of the whole plant—e.g. by regulating levels of oxygen, carbon and mineral nutrients in the water.

TABLE 2

Replacements for chemicals in the current invention (holistic approach).

| Process (problem) | Added chemicals (Prior art solution) | Alternative measures (Current solution) |
|---|---|---|
| Settlement | Chlorine | High intake flow rate |
| Biofouling | Coagulants (e.g. ferric sulfates) | Flocculator, Reducing oxygen and carbon levels, avoiding antiscalants as nutrients |
| Corrosion | | Lowering oxygen level |
| Scaling | Antiscalants | Reducing recovery rate |
| Post-treatment | Minerals, e.g. $CaCO_3$, disinfectors | Electrolytic transfer unit (from brine) |

Figure 5:
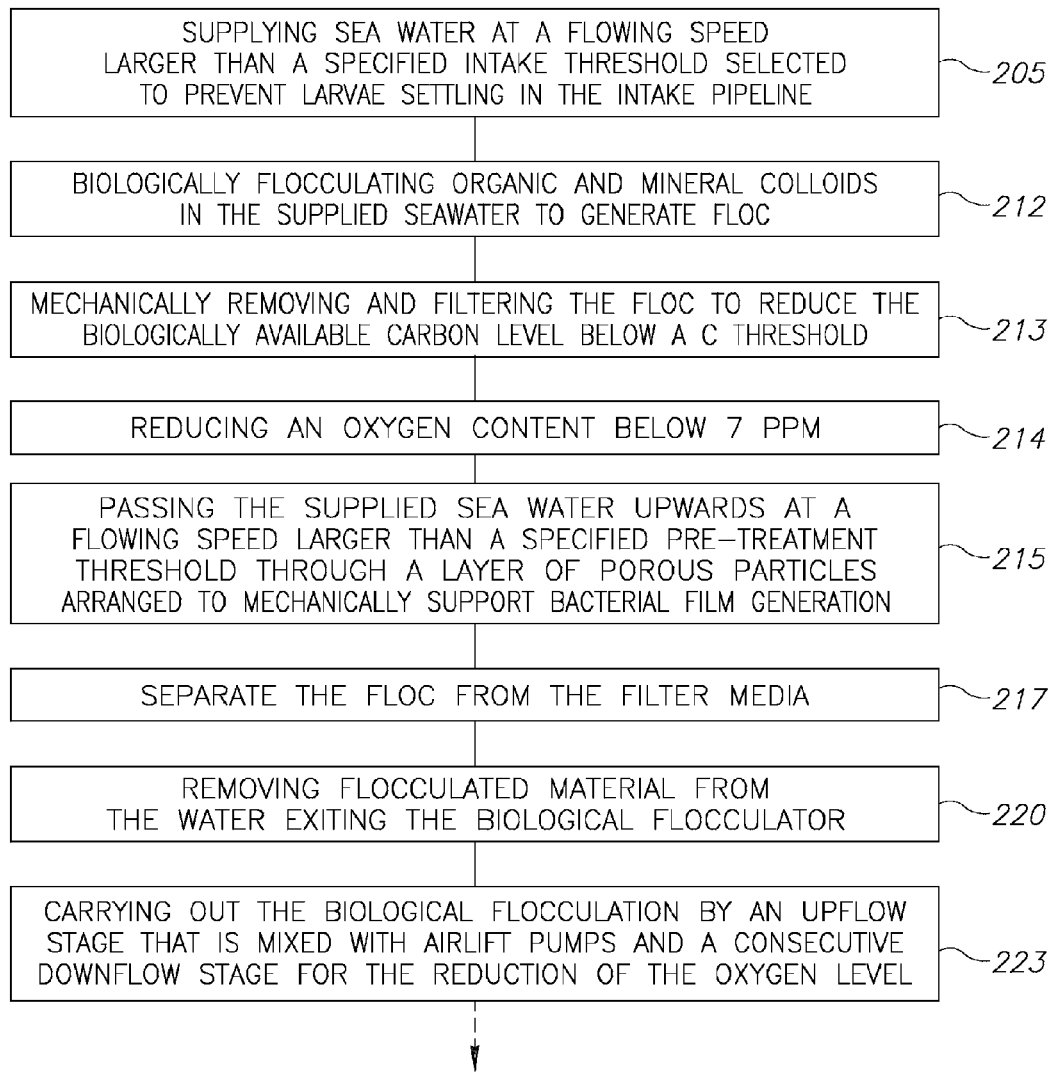
FIG. 5 is a high level flowchart illustrating a method of operating a desalination system and a flocculator without external addition of chemicals, according to some embodiments of the invention.
Figure 5:
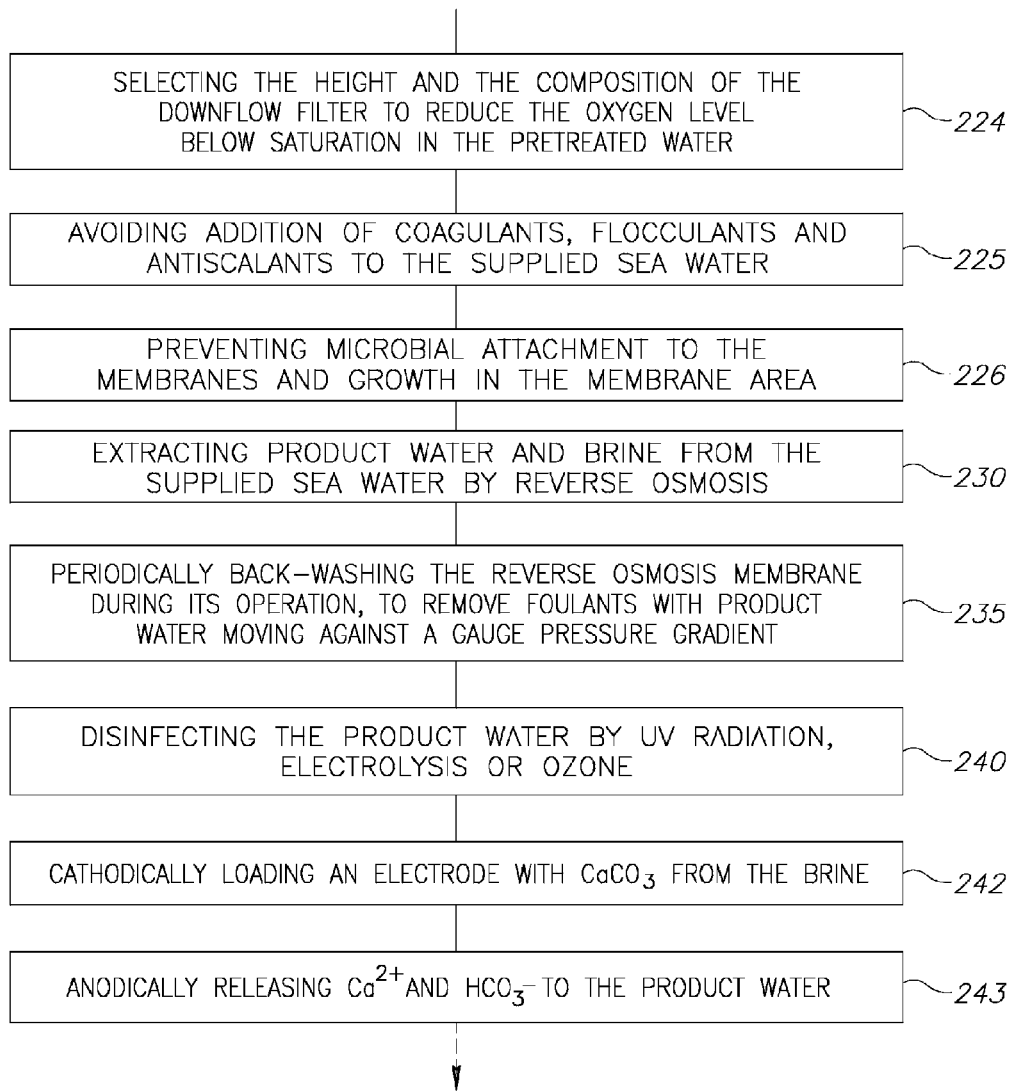
Figure 5:
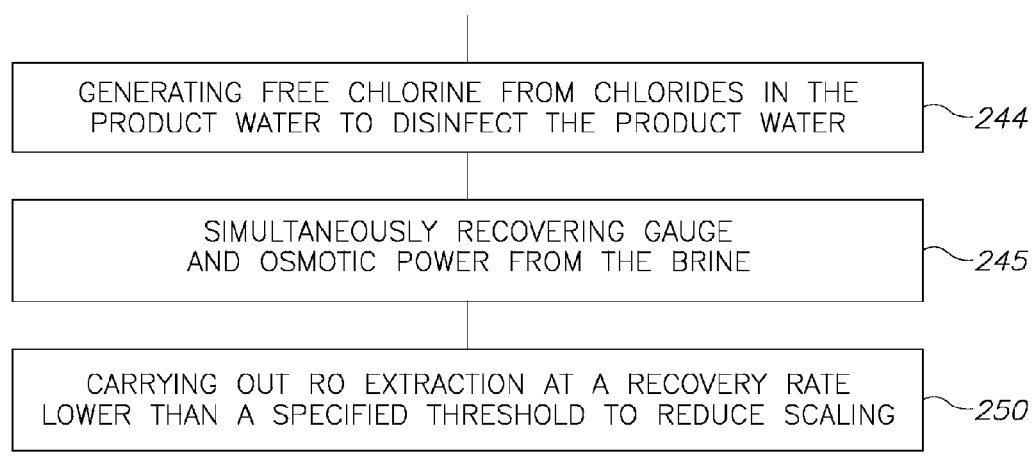

FIG. 5 is a high level flowchart illustrating a method 200 of operating a desalination system without any external addition of chemicals, according to some embodiments of the invention.

Method 200 comprises the following stages: supplying sea water at a flowing speed in the pipeline larger than a specified intake threshold speed (e.g. 2 m/sec, or between 1.5 and 3 m/sec) selected to prevent larvae settling in the intake pipeline (stage 205); reducing an oxygen content below an $O_2$ threshold (e.g. oxygen saturation, ca. 7-8 ppm or a lower level of ca. 4 ppm, depending on specific conditions) and an amount of accessible organic carbon below a C threshold (e.g. 0.5 NTU or lower) in the supplied sea water (stages 213, 214); by passing the supplied sea water upwards at a flowing speed larger than a specified pre-treatment threshold speed (e.g. between 15 and 70 m/hour) through a layer of porous particles arranged to mechanically support bacterial film generation (stage 215); to yield biological flocculation of organic and mineral material thereupon (stage 212), and separate the floc from the filter media (stage 217), optionally also removing flocculated material from the water exiting the biological flocculator (stage 220), wherein the generating specifically avoids adding iron, coagulants, flocculants and antiscalants to the supplied sea water (stage 225).

Passing the water through the layer of porous particles (stage 215) causes biological flocculation of organic and mineral colloids in the supplied seawater to generate floc (stage 212). Removing the flocculated organic material (stage 213) may comprise mechanically removing the floc to generate an organic carbon level lower than 2-3 ppm. The reduced $O_2$ threshold may be 7 ppm (stage 214), and generally lies at an unsaturated oxygen level. The low oxygen and carbon levels prevent microbial attachment to the membranes and growth in the water (stage 226), resulting in prevention of fouling and scaling, as well as corrosion of metal parts, especially in the piping. The biological flocculation (stage 212) may be carried out by an upflow stage that is mixed with airlift pumps and a consecutive downflow stage for the reduction of the oxygen level (stage 223). The height and composition of the downflow filter may be selected to reduce the oxygen level below saturation in the pretreated water (stage 224).

Method 200 further comprises extracting product water and brine from the supplied sea water by reverse osmosis (stage 230).

Method 200 further comprises periodically back washing the reverse osmosis membrane during its operation at a specified frequency to remove foulants which passed through the biological flocculation and the mechanical removal (stage 212, 213) (to prevent membrane fouling) and scale nuclei therefrom (stage 235), for example back washing membrane elements with product moving against a gauge pressure gradient. Back washing (235) removes foulants and scaling nuclei that were not removed from the system by pre-treating the sea water (205-215) as well as bacteria that originate in the biological flocculation, before they compromise or damage the membranes. The backwashing frequency is selected according to the characteristics of the system and supplied water, and may be, for example a daily frequency. In particular, backwashing (stage 235) may allow using a less expensive pre-treatment method and compensate for bacteria from the biological flocculation that remain in the pre-treated water.

Method 200 further comprises disinfecting the product water (stage 240), e.g., by UV radiation, electrolysis and/or ozone. Avoiding external addition of chemicals (e.g. stage 225) is useable to spare associated chemicals' supply and storage demands.

Method 200 may further comprise of cathodically loading an electrode with $CaCO_3$ from the brine (stage 242) and releasing $Ca^{2+}$ and $HCO_3^-$, anodically, to the product water (stage 243), and further generating (e.g. simultaneously) free chorine from chlorides in the product water (stage 244) for product water disinfection.

Method 200 may further comprise using self cleaning filters, cleanable by back washing, using low PREN stainless steel in the high pressure piping and implementing a configuration of eight membrane elements per pressure vessel, which diminishes power consumption.

Method 200 may further comprise simultaneously recovering gauge and osmotic power the brine (stage 245).

Method 200 may further comprise carrying out the product water extraction (stage 230) at a recovery rate lower than a specified threshold (stage 250, e.g. 40-48%), to enable a specified reduction of an input pressure of the supplied sea water and a specified reduction in brine salinity as well as to reduce or prevent scaling.

All stages of desalination system 100 are configured to avoid the need to add chemicals externally to desalination system 100. Prevention of membrane fouling is carried out biologically (flocculation of colloids, creation of low O and low C levels) and mechanically (high water flow speed, back washing the membrane) instead of chemically. Avoidance of chemical use allows the operation of desalination system 100 without having to store, dose and supply chemicals to it. Hence, the operation of desalination system 100 is simpler, cheaper, and compatible with urban regulations concerning chemicals.

Desalination system 100 is also optimized energetically to use minimal energy to desalinate the water by recovering power and operating at a maximal product water to energy use ratio. Minimizing energy requirements further reduce operation costs. Some of the required energy may be generated locally, e.g. from solar panels mounted upon desalination system 100. In an overall effect, desalination system 100 requires sea water and electricity alone to produce product water.

The proposed invention advances beyond WIPO Publication No. 2006/057249, which also aims at reducing the level of chemicals in a desalination system, in several decisive aspects. In particular, the biological filter in the invention is built to support bacterial film growth in order to bind colloids, which is very different from the active carbon filter in the publication.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of operating a reverse osmosis desalination system, the method comprising:
   supplying seawater at a flowing speed between 1.5 and 3 m/sec selected to prevent larvae settling in an intake pipeline,
   biologically flocculating organic and mineral colloids in the supplied seawater by an upflow stage that is mixed with airlift pumps and a consecutive downflow stage for the reduction of the oxygen level, to generate floc,
   mechanically removing the floc to generate an accessible organic carbon level lower than 2.5 ppm,
   reducing an oxygen content below saturation to prevent microbial attachment to membranes and growth in the water, to produce feed water,
   extracting product water and brine from the feed water by reverse osmosis, and
   disinfecting the product water.

2. The method of claim 1, further comprising daily back washing a reverse osmosis membrane to remove bacteria from the biological flocculation therefrom.

3. The method of claim 1, further comprising providing the seawater to the biological flocculating at a flowing speed between 15 and 60 m/hour.

4. The method of claim 1, further comprising simultaneously recovering gauge and osmotic power from the brine and operating the reverse osmosis at a recovery rate reduced from a maximal recovery rate by 10%.

5. The method of claim 1, further comprising not adding any acids, pH regulators, ferric compounds, antiscalants, chlorine, coagulants and flocculants, or biocides.

6. A desalination system comprising an intake unit pumping seawater via an intake pipeline and providing the pumped seawater to a pre-treatment unit connected to a reverse osmosis (RO) desalination unit, the desalination system characterized in that:
   the intake unit is arranged to operate at a flowing speed between 1.5 and 3 m/sec in the intake pipeline to prevent settling of larvae in the intake pipeline,
   the pre-treatment unit comprises an upflow biological flocculator and a downflow filter, and is arranged to supply the seawater to the upflow flocculator at a flowing speed between 15 and 60 m/hour,
   the biological flocculator comprises a layer of porous particles arranged to mechanically support biofilm generation to bind and flocculate colloids from the water without adding coagulants or flocculants of any type to the water,
   wherein the pre-treatment unit is further arranged to separate floc from the porous particles, and
   wherein a height and a composition of the downflow filter are selected to reduce an oxygen level below saturation in the pretreated water, and remove remaining floc, to suppress microbial attachment and growth in the RO unit.

7. The desalination system of claim 6, wherein the biological flocculator is further arranged to maintain an oxygen level of at least oxygen saturation in the water to support biofilm generation by adding air to the water.

8. The desalination system of claim 6, wherein the pretreatment unit is further arranged to remove floc from water exiting the biological flocculator.

9. The desalination system of claim 6, wherein the porous particles are selected from ground tuff, expanded clay, ceramic particles and a zeolite.

10. The desalination system of claim 6, wherein the downflow filter comprises a coarse filter positioned above fine filter.

11. The desalination system of claim 6, wherein the upflow biological flocculator comprises at least one airlift pump arranged to separate floc from the porous particles and mix and aerate the water and the layer in the upflow flocculator.

12. The desalination system of claim 6, wherein the RO desalination unit is further associated with an energy recovery unit arranged to simultaneously recover gauge and osmotic power from the brine.

13. The desalination system of claim 6, wherein the RO desalination unit is arranged to operate at a recovery rate of 40-48%, to enable a specified reduction in an input pressure of the supplied sea water and a specified reduction in brine salinity.

14. The desalination system of claim 6, further comprising a post treatment unit receiving desalinated water from the RO unit and arranged to disinfect and add minerals to the desalinated water.

15. The desalination system of claim 14, wherein the disinfection is carried out by UV radiation and/or electrolysis.

16. The desalination system of claim 14, wherein the post treatment unit comprises an electrolytic unit arranged to load an electrode operating as a cathode with $CaCO_3$ from the brine, and operate the loaded electrode as an anode in the product water to release $Ca^{2+}$ and $HCO_3^-$ to the product water and further generate free chorine from chlorides in the product water, wherein the generated free chlorine is usable to disinfect the product water.

17. The desalination system of claim 6, further comprising a direct osmosis cleaning unit connected to the RO unit and arranged to remove bacteria, originating from the pre-treatment unit, from RO membranes of the RO unit by backwashing the RO membranes daily with product water moving against a gauge pressure gradient.

18. A pre-treatment unit in a reverse osmosis (RO) desalination system, comprising:
an upflow biological flocculator, arranged to receive seawater at a flowing speed between 15 and 60 m/hour, and comprising a layer of porous particles arranged to mechanically support biofilm generation to bind and flocculate organic and mineral colloids from the water without adding coagulants of any type to the water, the biological flocculator further arranged to maintain at least oxygen saturation in the water to support biofilm generation, wherein floc is removed from water exiting the biological flocculator, and
a downflow filter receiving the water exiting the biological flocculator and having at least one filtering layer, of which a height and a composition are selected to reduce an oxygen level below saturation in the pretreated water and remove remaining floc, to suppress microbial attachment and growth in the pretreated seawater.

19. The pre-treatment unit of claim 18, wherein the reduced oxygen level is below 7 ppm and wherein floc is removed from the water to reduce carbon level in the water to below 2.5 ppm.

20. The pre-treatment unit of claim 18, wherein the porous particles are selected from ground tuff, expanded clay, ceramic particles and a zeolite.

21. The pre-treatment unit of claim 20, wherein the upflow biological flocculator comprises at least one airlift pump arranged to separate floc from the porous particles and mix and aerate the water and the layer in the upflow flocculator.

22. A method of operating a reverse osmosis desalination system, the method comprising:
supplying seawater at a flowing speed between 1.5 and 3 m/sec selected to prevent larvae settling in an intake pipeline,
biologically flocculating organic and mineral colloids in the supplied seawater to generate floc,
mechanically removing the floc to generate an accessible organic carbon level lower than 2.5 ppm,
reducing an oxygen content below saturation to prevent microbial attachment to membranes and growth in the water, to produce feed water,
extracting product water and brine from the feed water by reverse osmosis,
disinfecting the product water, and
simultaneously recovering gauge and osmotic power from the brine and operating the reverse osmosis at a recovery rate reduced from a maximal recovery rate by 10%.

* * * * *